(12) United States Patent
Cheng et al.

(10) Patent No.: US 12,493,416 B1
(45) Date of Patent: Dec. 9, 2025

(54) MEMORY SUB-SYSTEM INITIATED BURST SCAN UNDER LOW POWER MODE

(71) Applicant: Micron Technology, Inc., Boise, ID (US)

(72) Inventors: Chao-Han Cheng, San Jose, CA (US); Lei Zhang, Bukit Timah (SG); Srinivasa Reddy Kunduru, Bukit Panjang (SG)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/819,545

(22) Filed: Aug. 29, 2024

(51) Int. Cl.
*G06F 3/06* (2006.01)

(52) U.S. Cl.
CPC .......... *G06F 3/0619* (2013.01); *G06F 3/0634* (2013.01); *G06F 3/0679* (2013.01)

(58) Field of Classification Search
CPC ..... G06F 3/0619; G06F 3/0679; G06F 3/0634
See application file for complete search history.

(56) References Cited

U.S. PATENT DOCUMENTS

| | | | | |
|---|---|---|---|---|
| 11,222,704 | B1* | 1/2022 | Rayaprolu | G11C 11/5628 |
| 11,494,095 | B1* | 11/2022 | Yeung | G06F 3/0653 |
| 2007/0047506 | A1* | 3/2007 | Froehling | H04W 68/00 370/311 |
| 2015/0043284 | A1* | 2/2015 | Sakuma | G11C 7/04 365/185.25 |
| 2020/0210303 | A1* | 7/2020 | Ji | G06F 11/1048 |

\* cited by examiner

*Primary Examiner* — Mark A Giardino, Jr.
(74) *Attorney, Agent, or Firm* — Lowenstein Sandler LLP

(57) ABSTRACT

A wake up cadence at which the memory device is to wake up during a low power mode is determined. Based on the wake up cadence, a processing device determines a finite number of pages of the memory device to be scanned per wake up during the low power mode to satisfy a criterion for memory device qualification, the criterion being associated with the memory device's data retention capability. Upon detecting the low power mode, a burst scan operation is performed to scan the finite number of pages in the memory device each time the memory device wakes up at the determined cadence.

20 Claims, 6 Drawing Sheets

300 

Determine a wake up cadence at which a memory device is to wake up during a low power mode 302

Determine, based on the wake up cadence, a finite number of pages to be scanned per wake up during the low power mode to satisfy a criterion for memory device qualification, the criterion being associated with a data retention capability of the memory device 304

Upon detecting the low power mode, perform burst scans to scan the finite number of pages each time the memory device wakes up at the wake up cadence 306

FIG. 3

MEMORY SUB-SYSTEM INITIATED BURST SCAN UNDER LOW POWER MODE

TECHNICAL FIELD

Embodiments of the disclosure relate generally to memory sub-systems, and more specifically, relate to a burst scan initiated by a memory sub-system when a memory device within the memory sub-system is under a low power mode.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method to perform a burst scan when a low power mode is detected, in accordance with some embodiments of the present disclosure.

DETAILED DESCRIPTION

Figure 1:
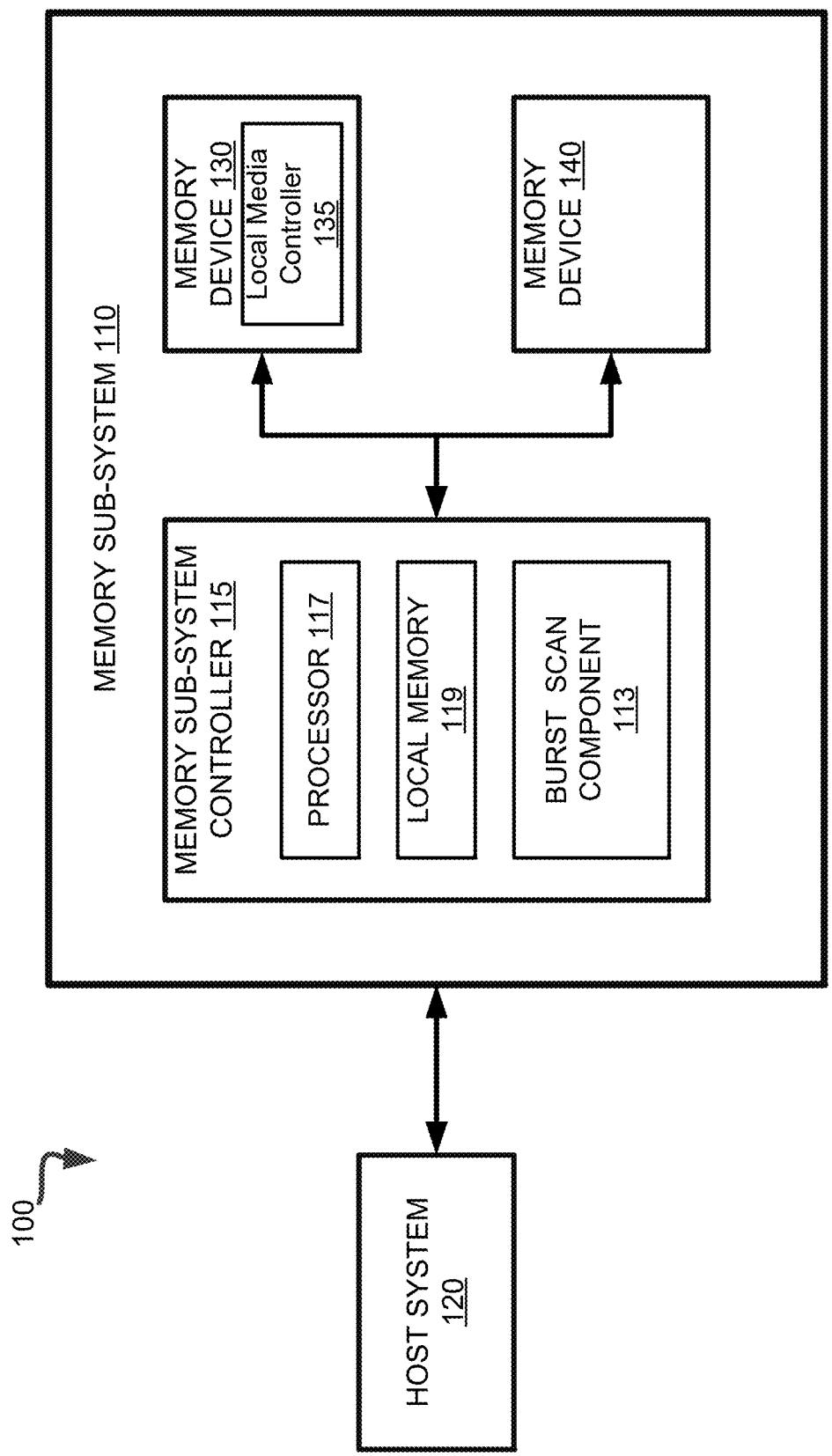
FIG. 1 illustrates an example computing system that includes a memory sub-system in accordance with some embodiments of the present disclosure.

Aspects of the present disclosure are directed to a burst scan operation initiated by a memory sub-system under a low power mode. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system. Additionally, the memory sub-system can initiate periodic scans of the memory devices therein to ensure integrity of the stored data.

When an intended application of a memory device is known, a mission profile for the memory device is created for that intended application. The mission profile is a collection of relevant environmental and functional loads that the memory device is expected to endure during its lifetime. For example, for a memory device to be used for an automotive application, the mission profile involves detailing the operational conditions (e.g., operating temperature, power consumption, etc.), expected environmental stresses (e.g., variation in temperature, vibration, variation in power supply, etc.) and reliability requirements (e.g., number of program/erase cycles before an error rate becomes unacceptable, duration of data retention, etc.).

Traditionally, automotive mission profiles included two distinct power modes: a power on mode (also known as an active mode or an "awake" mode), and a power off mode. In a specific example, the memory device was traditionally expected to be in a power on mode for 9% of its lifetime and remain in a power off mode for 91% of its lifetime. During the power on mode, enough power is available to complete a full media scan (by performing a series of scans at a predetermined periodicity within a finite period of time) to ensure integrity of the stored data in the memory device. But during the power off mode, media scan was completely stopped in the traditional mission profiles.

With the evolution of the newer versions of the automotive mission profiles, current and future memory devices are expected to be in a power on mode for a larger portion of their lifetime (e.g., 25% of the lifetime), and remain in a low power mode for the remaining portion of their lifetime (e.g., 75% of the lifetime). In the new mission profiles, the memory devices are not in a complete power off mode for any significant time within their lifetime.

Though the power on mode is longer, in the newer versions of mission profiles, power optimization is of pivotal importance, and the media scan operation is not set at a cadence (i.e., periodicity) that is adequate to complete a full media scan before the memory device enters the low power mode.

During low power modes (e.g., power saving mode 3 (PS3) or power saving mode 4 (PS4)), there is very limited power available for the memory device to continue the media scan that was started during the power on mode. Therefore, if parameters of the media scan are not tuned (with respect to the regular scan rate of one page per round of scan) when the memory device switches to the low power mode from the power on mode, there is a risk of prolonging the total time required to complete a full media scan. This additional time requirement may not meet a reliability requirement for the memory device for the automotive mission profile.

As a specific example of the shortcoming of the traditional approach, consider that for a specific operating temperature (e.g., 55° C.), a data retention capability for a specific type of memory device is such that all the relevant pages of the memory device should be scanned for errors at least once within a finite period of time, 'T.' In this example, T can be close to one month. However, the memory device is almost certain to enter a low power mode within that finite period of time. During the low power mode, the memory device cannot afford to continue to initiate scanning operation at the same cadence as it was allowed to do during a power on mode, because each initiation of the scanning operation requires the memory device to wake up, and a significant amount of power is diverted to the wake up operation that may affect other concurrent operations in the low power mode, for example latency of catering to a read command during the low power mode can be detrimentally affected. Therefore, in the traditional approach, the memory device slows down the scanning cadence. As a result of slower scanning cadence, it may take longer (e.g., two months instead of one month) to scan all the pages in the memory device. This slowing down runs afoul of the reliability requirement for the memory device, and the memory device is no longer qualified for the intended automotive mission profile.

This problem is aggravated when the memory device enters a low power mode at a higher operating temperature (e.g., 55-80° C.). Low power mode at a higher operating temperature may shorten the data retention capability to less than the specified data retention capability at a nominal temperature, requiring that a full scan is completed in an even shorter period of time than 'T.' The data retention capability of a memory device is usually measured in terms of a length of time, and is closely related to the endurance rating of the memory device, i.e. how many program/erase cycles the memory device can endure it its lifetime before an error rate become unacceptable.

Aspects of the present disclosure address the above and other shortcomings by initiating scans with altered scanning parameters when the memory device enters a low power mode. The scans with the altered scanning parameters are initiated by the memory sub-system rather than by a host system. The scans initiated by the memory sub-system during the low power mode are referred to as "burst scans," as typically more than one page is scanned every time the device wakes up during the low power mode.

Advantages of the present disclosure include, but are not limited to, ensuring media reliability even when a memory device stays in the low power mode for the majority of its lifetime of operation. The burst scan mechanism described herein introduces minimal power spikes in the mission profile, without any significant impact to average power consumption (e.g., less than 1% change in power consumption).

A memory sub-system referred to in this disclosure can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. A non-volatile memory device is a package of one or more dies. Each die can include one or more planes. For some types of non-volatile memory devices (e.g., NAND devices), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can have a row of associated memory cells in a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include multiple access line driver circuits and power circuits that can be shared by the planes of the memory device to facilitate concurrent access of pages of two or more memory planes, including different page types. For ease of description, these circuits can be generally referred to as independent plane driver circuits. Depending on the storage architecture employed, data can be stored across the memory planes (i.e., in stripes). Accordingly, one request to read a segment of data (e.g., corresponding to one or more data addresses), can result in read operations performed on two or more of the memory planes of the memory device.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs). In this disclosure, an SSD is described as an example storage device which is scanned for ensuring data integrity and device reliability.

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. Though in this disclosure, commands for scanning are initiated by the memory sub-system itself for maintaining data integrity. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In some embodiments, the memory sub-system 110 includes a burst scan component 113 that can configure parameters for burst scan operations, as described in greater detail below. In some embodiments, the memory sub-system controller 115 includes at least a portion of the burst scan component 113. In other embodiments, local media controller 135 includes at least a portion of burst scan component 113 and is configured to perform the functionality described herein.

The burst scan component 113 can work in concert with other components (for example processor 117) in the memory sub-system controller 115 to initiate and manage the scanning operations as part of a data integrity maintenance process. Specifically, the burst scan component 113 determines how many pages should be scanned each time the memory device 130 wakes up during a low power mode. Further details with regards to the operations of the burst scan component 113 are described below.

Figure 2:
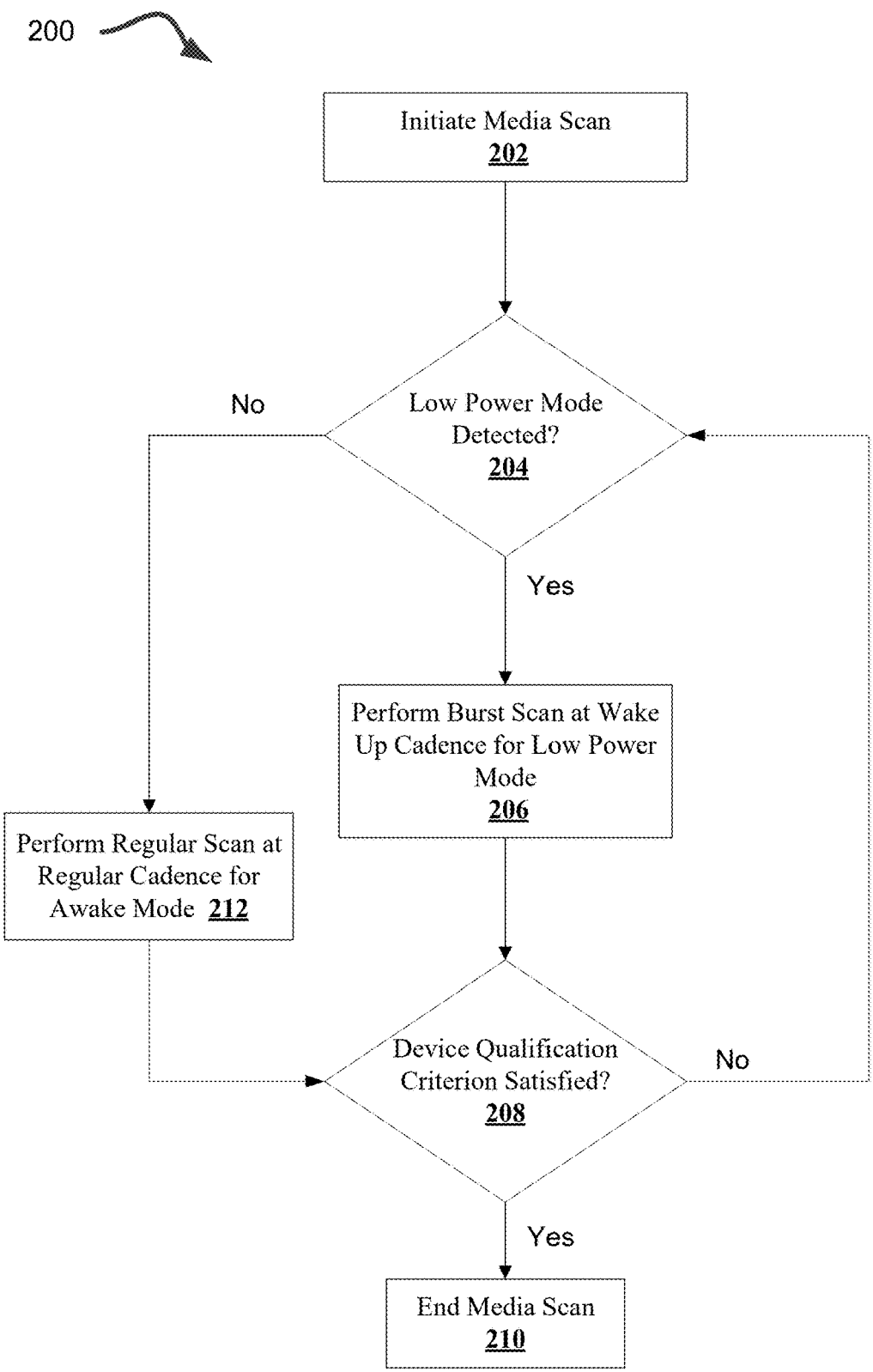
FIG. 2 is a flow diagram of an example method to determine whether to perform a regular scan or a burst scan, in accordance with some embodiments of the present disclosure.

FIG. 2 is a flow diagram of an example method 200 to determine whether to perform a regular scan or a burst scan, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the processor 117 of the memory sub-system controller 115 of FIG. 1. Some operations or part thereof may be performed by the burst scan component 113 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing logic initiates a media scan. For example, the memory sub-system controller 115 can initiate the media scan to be performed without having to be prompted by the host system 120. A media scan is necessary to help identify potential issues with the physical storage media (e.g., memory device 130, 140 in FIG. 1) that can lead to data loss. In other words, media scan is a maintenance process to ensure that stored data is readable when the host system eventually issues a command to read the stored data. Ideally the media scan should cover all pages within the memory device where previously written data is stored. This is referred to as a full media scan.

As will be clear with respective to the subsequent flowcharts 300-500, the media scan initiation can take place without first checking whether the memory device 130 is in an awake mode or in a low power mode. In some embodiments, the default setting for the memory sub-system controller is to perform the scan at a predetermined periodicity configured in its firmware. The predetermined periodicity is referred to as a regular cadence. The regular cadence is configured into the memory sub-system controller 115 based on prior knowledge of available power and a total number of pages to be scanned when the memory device is in a power on or "awake" mode. One of the objectives of the embodiments of this disclosure is to dynamically change the scanning parameters (i.e., scanning cadence, power consumption, number of pages per scan etc.).

At operation 204, the processing logic detects whether the memory device has entered a low power mode. If it is detected that the memory device has entered a low power mode, the processing logic advances to operation 206. On the other hand, if it is detected that the memory device has entered a low power mode, the processing logic advances to operation 212.

At operation 206, the processing logic performs a burst scan operation, where more than one page is scanned each time the memory device wakes up. The parameters of the burst scan operation are determined by the burst scan component 113 shown in FIG. 1. The burst scan component 113 further configures the memory sub-system controller 115 to cause the scanning operation. Parameters of the burst scan operation include but are not limited to a wake up cadence (i.e., at what time interval the memory device wakes up at a low power mode, and how many pages to be scanned per wake up). After each round of the burst scan operation, the memory sub-system controller 115 can keep a record of which pages have already been scanned, so that in the next wake up, the same pages are not scanned again until all the pages have been scanned within a finite time period that is associated with the data retention capability of the memory device 130. The record can be stored in the local memory 119 within the memory sub-system controller 115 for easy access during the next round of the burst scan operation.

At operation 208, the processing logic determines whether a device qualification criterion is satisfied. The device qualification criterion is related to a reliability of the memory device to be used for an identified mission. As a non-limiting example, if a NAND-based memory device is to be used for an automotive mission, a device qualification criterion can be based on a total number of pages of the memory device that needs to be scanned within a finite period of time. The finite period of time depends on a device's known data retention capability at known operational temperature that the memory device is expected to experience. As mentioned above, the data retention capability of the same type of memory device can deteriorate when the memory device operates at a temperature that is higher (or, in some cases, lower) than the nominal temperature. Therefore, the device qualification criterion can be set to correspond to the data retention capability at the elevated temperature rather than at the nominal temperature. The unit of data retention capability is usually in several months to several years. Further details of device qualification criterion are discussed in method 500 shown in FIG. 5.

If it is determined that the device qualification criterion is satisfied, the processing logic advances to operation 210, where media scan ends. On the other hand, if it is determined that the device qualification criterion is not yet satisfied, e.g., there are more pages left to be scanned, the processing logic circles back to operation 204 again and determines whether to proceed to operation 206 or operation 212, depending on the detected power mode at operation 204.

At operation 212, once it is detected that the memory device 130 is not in a low power mode, the processing logic performs a regular scan operation, where typically one page is scanned in each round of regular scan performed at a regular cadence that is configured for an "awake" mode. Similar to the burst scan operation, even during the regular scan operation, the memory sub-system controller 115 can keep a record of which pages have already been scanned in the prior rounds of scan (regular scan or burst scan), so that during the next scan, the same pages are not scanned again until all the pages have been scanned within the finite time period that is associated with the data retention capability of the memory device.

As shown in FIG. 2, after each round of regular scan (operation 212) or burst scan (operation 206), the processing logic proceeds to operation 208 to check whether the device qualification criterion has been satisfied, and the operations 212 or 206 is repeated until the device qualification criterion is satisfied, i.e., all the pages with stored data has been scanned successfully within a predetermined finite period of time.

As will be clear below with reference to FIGS. 3-5, this disclosure describes systems and methods that can adjust to variation of power mode (i.e., when the memory device switches from an awake mode to a low power mode, or vice versa), and accomplishes scanning of the same number of pages within the predetermined finite period of time irrespective of how often the memory device toggles between a regular scan mode and a burst scan mode within that finite period of time.

FIG. 3 is a flow diagram of an example method 300 to perform a burst scan when a low power mode is detected, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least some operations of method 300 are performed by the burst scan component 113 of the memory sub-system controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 300 shows further details of the operation 206 described in method 200 shown in FIG. 2. Some operations of method 300, e.g., operations 302 and 304 can take place even prior to a low power mode is detected, for example at operation 204 described in method 200. However, at least the final operation of method 300 (operation 306) is triggered after a low power mode is detected.

At operation 302, the processing logic determines a wake up cadence at which a memory device is to wake up during a low power mode. Determination of the wake up cadence can be done by the burst scan component 113, or it can be determined by other components in the memory sub-system controller 115. The wake up cadence is determined based on how much power is available during the low power mode, and what operations the memory device performs each time it wakes up. Only a portion of the total power is available for scanning the pages, as the memory device may require to perform operations other than scanning during the low power mode that would share the limited supply of power. Since in the newer versions of the mission profiles, the memory device spends a majority of its lifetime in the low power mode, in some scenarios, some read commands from the host system may have to be catered to during the low power mode. If too large of a fraction of the power available at the low power mode is used up for scanning, other operations, including possible read operations, may suffer from unacceptable latency. However, in most embodiments, no commands from the host system will be accepted during low power mode, as the host system will be aware, per predetermined protocol, that to be able to accept a command from the host system, a wake up from the low power mode is needed first. In general, in the low power mode, the memory device turns off some components, such as ASIC/PMIC or NAND to get to the ideal power consumption target with sacrifice on latency. The processing logic factors in a tradeoff between power consumption and latency in determining an acceptable wake up cadence. During awake mode, usually one page is scanned in each round of regular scanning operation, but the scanning rounds are repeated more frequently as power rationing is less significant of an issue during the awake mode compared to that during a low power mode. To determine the wake up cadence during the low power mode, the burst scan component 113 obtains some characteristics of the memory device, including but not limited to, the type of device (e.g., NAND), the operational temperature, the available power etc., and performs a tradeoff analysis of how to keep the power spikes due to the burst scan operations below a certain threshold (e.g., power spike should be less than 1% during a burst scan) so that no significant latency is observed in the other operations performed by the memory device in the low power mode.

At operation 304, the processing logic determines, based on the wake up cadence, how many pages are to be scanned per wake up during the low power mode to satisfy a criterion for the memory device qualification. For example, the burst scan component 113 shown in FIG. 1 can perform operation 304. As discussed above, the criterion for the memory device qualification is related to the particular type of device's known data retention capability. The burst scan component 113 receives a set of characteristics of the memory device, including but not limited to how many total number of pages of the memory device are to be scanned within a finite period of time, the finite period of time being related to the memory device's data retention capability. The burst scan component then uses the wake up cadence determined at operation 302 to calculate the finite number 'n' of pages in each burst scan operation (i.e., one burst scan per wake up) according to the formula below:

$$n = \frac{W}{D*N} \quad \text{(Equation 1)}$$

where, W is the wake up cadence, D is the data retention capability, and N is the total number of pages to be scanned within a finite period of time to meet the device qualification criterion. In a non-limiting example, for a wake up cadence of 10 minutes (that can be sustained by NAND-based memory device in the low power mode, factoring in the power consumption and latency tradeoff), if a total number of pages to be scanned is in the range of 10000, and the target is to scan every page within approximately a month (e.g., 30-32 days), each time the memory device wakes up, at least two pages need to be scanned in the burst scan mode. These calculations can be done by the burst scan component 113 ahead of the low power mode and can be configured into the firmware of the memory sub-system controller 115 a priori.

In operation 306, upon detecting that the memory device has entered in a low power mode, the processing logic performs burst scans to scan the finite number of pages each time the memory device wakes up at the wake up cadence. Note that even though the burst scan component 113 determines how many pages to scan per wake up and possibly other burst scan parameters (e.g., which specific pages of which wordlines to scan in which sequence), the actual burst scan can be performed by the burst scan component 113 itself, or the burst scan component 113 can send commands to another component to perform the actual scan using the wake up cadence and the burst scan parameters.

Figure 4:
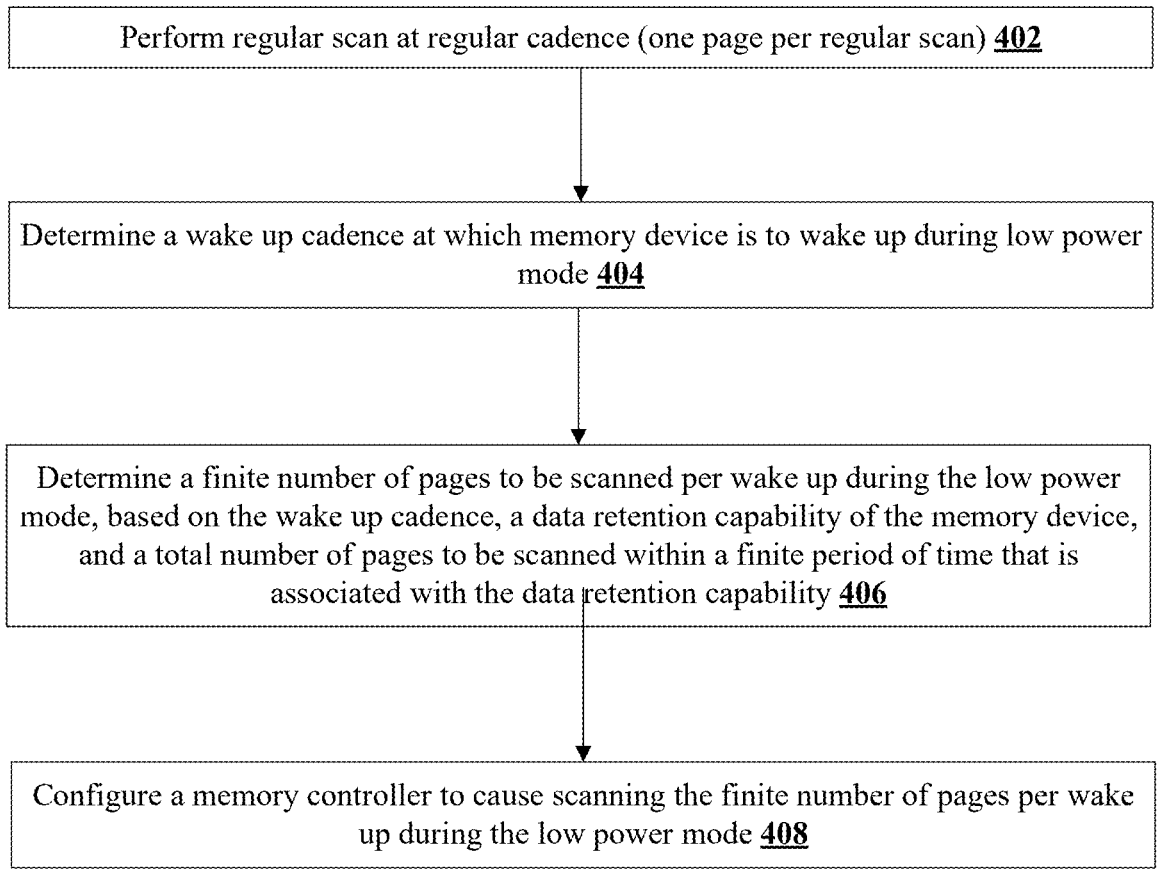
FIG. 4 is a flow diagram of an example method to switch to a burst scan from a regular scan when a low power mode is detected, in accordance with some embodiments of the present disclosure.

FIG. 4 is a flow diagram of an example method 400 to switch to a burst scan from a regular scan when a low power mode is detected, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the processor 117 of the memory sub-system controller 115 of FIG. 1. Some operations or part thereof may be performed by the burst scan component 113 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic performs regular scans at a regular cadence, as described with respect to method 200. The regular scan parameters can be the default setting for the memory sub-system controller, such as 115 in FIG. 1. For the method 400, it is assumed that the memory device is at an "awake" mode when the media scan is initiated, but is anticipated to enter a low power mode eventually.

At operation 404, the processing logic determines a wake up cadence at which a memory device is to wake up during a low power mode. Determination of the wake up cadence can be done by the burst scan component 113, or it can be determined by other components in the memory sub-system controller 115. Note that operation 404 is similar to operation 302 described with respect to method 300. In some embodiments, operation 404 can be performed by the burst scan component 113 while the memory device is still in the awake mode, but is expected to enter a low power mode in near future.

At operation 406, the processing logic (specifically burst scan component 113) determines a finite number of pages to be scanned per wake up during the low power mode based on the wake up cadence, the data retention capability of the memory device, and a total number of pages to be scanned within a finite period of time that is associated with the data retention capability. Operation 406 is similar to operation 304 described with respect to method 300. In some embodiments, operation 406 can be performed by the burst scan component 113 while the memory device is in still in the awake mode, but is expected to enter a low power mode in near future.

At operation 408, the processing logic configures a memory controller to cause scanning the finite number of pages per wake up during the low power mode. For example, burst scan component 113 can configure the memory sub-system controller 115 to cause the actual scanning using burst scan parameters, as determined by the burst scan component 113 while the memory device is still in "awake" mode. This preconfigured settings would save power when the memory device actually enters the low power mode and have instant access to the preconfigured setting rather than having to determine the burst scan parameters during the low power mode itself.

Figure 5:
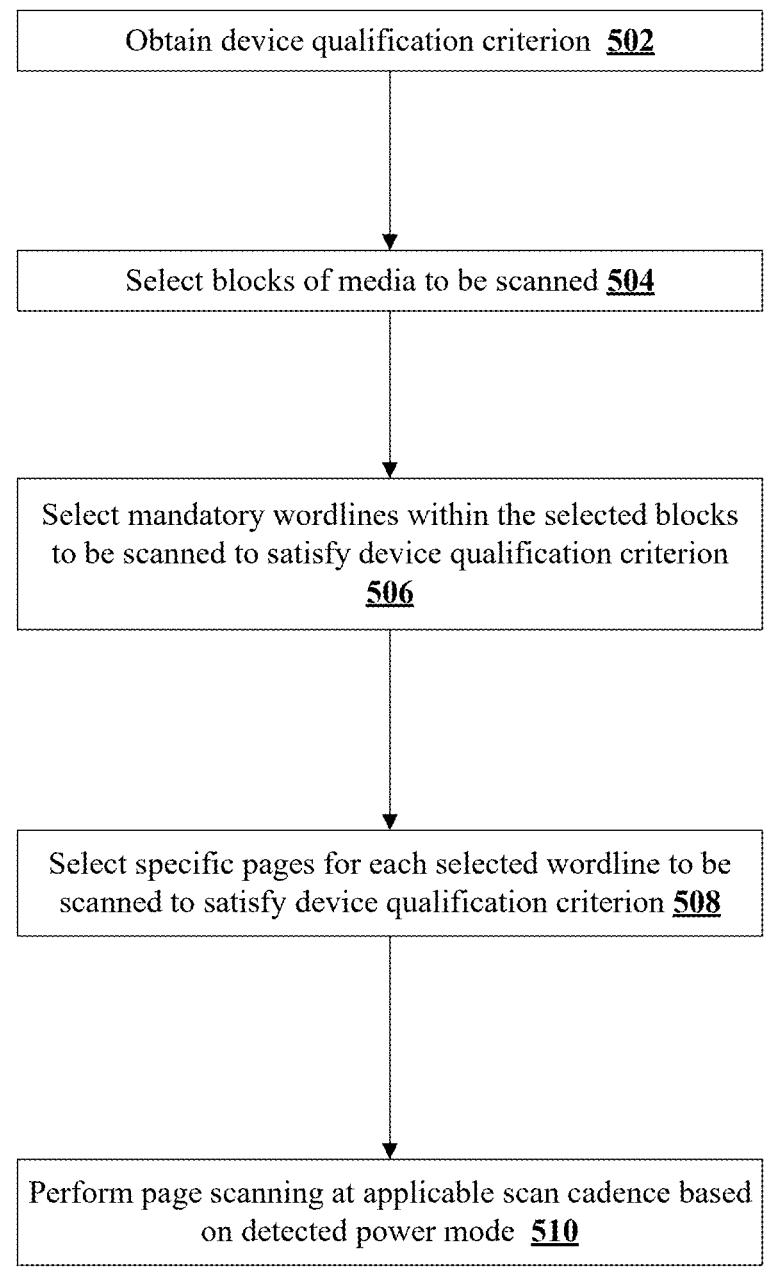
FIG. 5 is a flow diagram of an example method to perform a scanning of pages coupled to a plurality of mandatory wordlines to satisfy a device qualification criterion, in accordance with some embodiments of the present disclosure.

FIG. 5 is a flow diagram of an example method 500 to perform a scanning of pages coupled to a plurality of mandatory wordlines to satisfy a device qualification criterion, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the processor 117 of the memory sub-system controller 115 of FIG. 1. Some operations or part thereof may be performed by the burst scan component 113 shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic obtains a device qualification criterion. The criterion depends on the specific type of memory device being used and the mission for which the memory device is being chosen. For example, for an automotive mission, the device qualification criterion could be how many pages of the memory device is to be scanned within a finite period of time. The finite period of time can be calculated based on the device's data retention capability and/or endurance rating, i.e. how many program/erase cycles the memory device is expected to endure before data is unreliable because of degradation of the memory device over time. The degradation can be accelerated based on the mission for which the memory device is being qualified. An example mission would be an automotive mission where operating temperature is expected to vary during the lifetime of the memory device, causing additional stress to the memory device, and possibly shortening the data retention capability specified at a nominal temperature, and therefore shortening the finite period of time associated with the data retention capability.

The total number of pages to be scanned also depends on the specific device type. For example, the pages of the memory device are distributed among a multiple memory blocks. Each of those multiple blocks has a number of wordlines, each wordline having a number of pages associated therewith. One or more wordlines among the multiple wordlines are designated as mandatory wordlines, where at least a minimum number of pages per mandatory wordline are to be scanned to satisfy the criterion for the memory device qualification.

At operation 504, the processing logic select the blocks of the memory device to be scanned.

At operation 506, the processing logic selects the mandatory wordlines within the selected blocks to be scanned to satisfy the device qualification criterion. Note than more wordlines than the mandatory wordlines can be selected, but the number of wordlines depends on available power allocated for burst scan during the low power mode.

At operation 508, the processing logic selects the specific pages for each selected wordline to be scanned to satisfy the device qualification criterion. Note than more pages than a minimum number of pages per mandatory wordlines can be selected, but the number of pages per wordline depends on available power allocated for burst scan during the low power mode.

In a non-limiting example, for a NAND-based memory device, there are 520 blocks to be scanned, each block having 6 mandatory wordlines, where at least 3 pages per wordline need to be scanned to meet the device qualification criterion. The total number of pages to be scanned is 520×6×3=9360 pages. With a wake up cadence of 10 minutes, the memory controller needs to perform burst scan of 2 pages per wake up (as opposed to one page per scan at regular cadence during the awake mode) to be able to finish scanning all 9360 pages within the target time period of one month. The target of scanning 9360 pages every month is set based on the data retention capability of the NAND-based memory device.

At operation 510, the processing logic performs the actual scanning operation based on a detected power mode. For example, the detected power mode is "awake" mode, then regular scan cadence is selected. But if the detected power mode switches to a low power mode, the scanning operation seamlessly switches to the burst scan mode. This seamless switching ensures that the device qualification timeline is not elongated. For example, by scanning more than one pages per wake up during a burst scan mode, the memory sub-system controller 115 ensures that the low power mode does not detrimentally affect the device qualification process for a selected mission.

Figure 6:
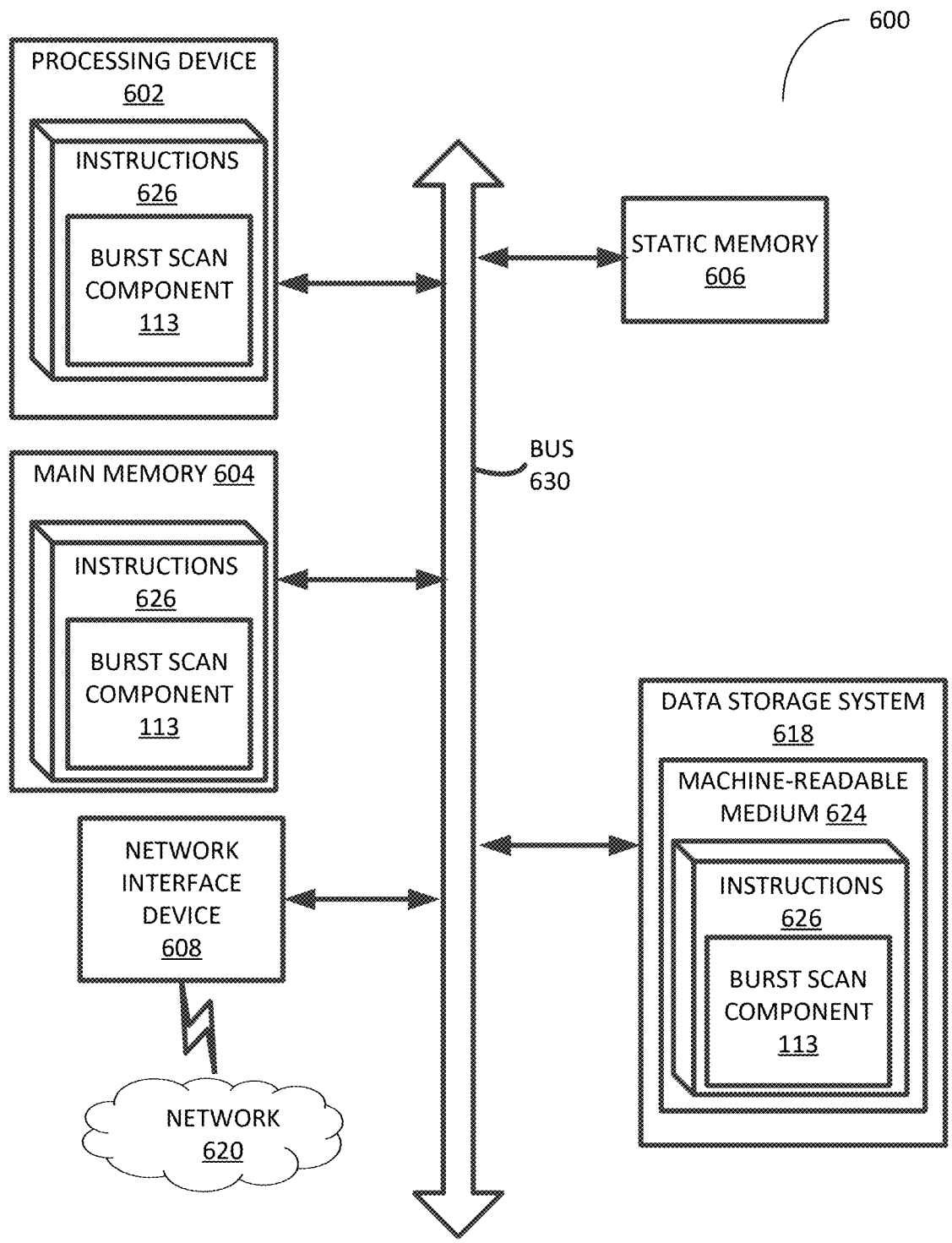
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the burst scan component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a media scan component (e.g., the burst scan component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory device; and
    a processing device, operatively coupled with the memory device, to perform operations comprising:
        determining a wake up cadence at which the memory device is to wake up during a low power mode;
        determining, based on the wake up cadence, a finite number of pages of the memory device to be scanned per wake up during the low power mode to satisfy a criterion for memory device qualification, the criterion being associated with a data retention capability of the memory device; and
        upon detecting the low power mode, performing burst scans to scan the finite number of pages in the memory device each time the memory device wakes up at the wake up cadence.

2. The system of claim 1, wherein the operations further comprise:
    determining a regular cadence at which the memory device is to be scanned during an awake mode; and
    upon detecting the awake mode, perform regular scan operations at the regular cadence, each regular scan operation scanning one page of the memory device.

3. The system of claim 2, wherein the operations further comprise:
    toggling between the burst scan and the regular scan based on detection of a current power mode of the memory device during an operational lifetime of the memory device.

4. The system of claim 1, wherein determining the wake up cadence at which the memory device is to wake up during the low power mode further comprises:
    factoring in a tradeoff between power consumption and a latency during the low power mode.

5. The system of claim 4, wherein the latency is associated with a command received by the memory device from a host system.

6. The system of claim 1, wherein the finite number of pages in the memory device to be scanned per wake up during the low power mode depends on a total number of pages to be scanned within a finite period of time, as dictated by the data retention capability of the memory device, the total number of pages being distributed among a plurality of blocks.

7. The system of claim 6, wherein each block of the plurality of blocks has a plurality of wordlines, each wordline having a plurality of pages associated therewith.

8. The system of claim 7, wherein one or more wordlines among the plurality of wordlines are mandatory wordlines, wherein at least a minimum number of pages per mandatory wordline are to be scanned to satisfy the criterion for the memory device qualification.

9. A method comprising:
    determining a wake up cadence at which a memory device is to wake up during a low power mode;
    determining, based on the wake up cadence, a finite number of pages of the memory device to be scanned per wake up during the low power mode to satisfy a criterion for memory device qualification, the criterion being associated with a data retention capability of the memory device; and upon detecting the low power mode, performing burst scans to scan the finite number of pages in the memory device each time the memory device wakes up at the wake up cadence.

10. The method of claim 9, further comprising:

determining a regular cadence at which the memory device is to be scanned during an awake mode; and upon detecting the awake mode, perform regular operations at the regular cadence, each regular scan operation scanning one page of the memory device.

11. The method of claim 10, wherein determining the wake up cadence at which the memory device is to wake up during the low power mode further comprises:

factoring in a tradeoff between power consumption and a latency during the low power mode.

12. The method of claim 11, wherein the latency is associated with a command received by the memory device from a host system.

13. The method of claim 9, wherein the number of pages in the memory device to be scanned per wake up during the low power mode depends on a total number of pages to be scanned within a finite period of time dictated by the data retention capability of the memory device, the total number of pages being distributed among a plurality of blocks.

14. The method of claim 13, wherein each block of the plurality of blocks has a plurality of wordlines, each wordline having a plurality of pages associated therewith.

15. The method of claim 14, wherein one or more wordlines among the plurality of wordlines are mandatory wordlines, wherein at least a minimum number of pages per mandatory wordline are to be scanned to satisfy the criterion for the memory device qualification.

16. A non-transitory computer-readable storage medium comprising instructions that, when executed by a processing device, cause the processing device to perform operations comprising:

performing regular operations of a memory device at a regular cadence, wherein during each regular scan operation, one page of the memory device is scanned;

determining a wake up cadence at which the memory device is to wake up during a low power mode;

determining a finite number of pages to be scanned per wake up during the low power mode, wherein the determination is based on the wake up cadence, a data retention capability of the memory device, and a total number of pages to be scanned within a finite period of time that is associated with the data retention capability; and configuring a memory controller to cause scanning the finite number of pages per wake up during the low power mode.

17. The non-transitory computer-readable storage medium of claim 16, wherein the processing device is to perform operations further comprising:

upon detecting that the memory device has entered the low power mode, initiating burst scans at the determined wake up cadence, wherein the finite number of pages are scanned during each burst scan operation.

18. The non-transitory computer-readable storage medium of claim 17, wherein the processing device is to perform operations further comprising:

upon detecting that the low power mode has ended, resuming the regular operations.

19. The non-transitory computer-readable storage medium of claim 16, wherein for determining the wake up cadence at which the memory device is to wake up during the low power mode, the processing device is to perform operations further comprising:

factoring in a tradeoff between power consumption and a latency during the low power mode.

20. The non-transitory computer-readable storage medium of claim 16, wherein at least a minimum number of pages per mandatory wordline among a plurality of wordlines in the memory device are to be scanned during the low power mode to satisfy a criterion for memory device qualification.

\* \* \* \* \*